United States Patent [19]

Scheuneman

[11] 4,092,713
[45] May 30, 1978

[54] POST-WRITE ADDRESS WORD CORRECTION IN CACHE MEMORY SYSTEM

[75] Inventor: James Herman Scheuneman, St. Paul, Minn.

[73] Assignee: Sperry Rand Corporation, New York, N.Y.

[21] Appl. No.: 805,686

[22] Filed: Jun. 13, 1977

[51] Int. Cl.² ............................................. G06F 11/08
[52] U.S. Cl. ................................................... 364/200
[58] Field of Search ............................. 364/200 MS

[56] References Cited

U.S. PATENT DOCUMENTS

| 3,588,829 | 6/1971 | Boland et al. | 364/200 |
| 3,786,427 | 1/1974 | Schmidt et al. | 364/200 |
| 3,840,862 | 10/1974 | Ready | 364/200 |
| 3,896,419 | 7/1975 | Lange et al. | 364/200 |
| 3,967,247 | 6/1976 | Anderson et al. | 364/200 |

*Primary Examiner*—Harvey E. Springborn
*Attorney, Agent, or Firm*—Kenneth T. Grace; William E. Cleaver; Marshall M. Truex

[57] ABSTRACT

An apparatus for and a method of providing error correction of the address word of a cache memory system (CMS) utilizing post-write storage of the least recently used (LRU) block of data words. Error correction circuitry (ECC) is provided at the output of the address buffer (CAB) portion of the cache memory system so that the address word that specifies the addressable location in the main storage unit (MSU) into which the block of data words, which block of data words is stored in the data buffer (CDB) portion of the cache memory, is to be stored or written-back is error corrected upon readout. This error correction of the address word ensures that correctable errors in the address buffer provided address words do not generate a Miss signal by the storage interface unit (SIU) which, in turn, requires a MSU reference even though the desired address word and the associated data word are available in the cache memory system.

4 Claims, 15 Drawing Figures

| BLOCK 0 | | | BLOCK 1 | BLOCK 2 | BLOCK 3 | CHECK BITS 6-BITS | PARITY BIT 1-BIT |
|---|---|---|---|---|---|---|---|
| BLOCK ADDRESS 8-BITS | AGE BITS 2-BITS | WRITE BACK 1-BIT | VALIDITY BIT 1-BIT | | | | |

BLOCK ADDRESS
  BITS $2^{16} - 2^9$ OF FIG. 4

AGE BITS
  11 ⇒ LEAST RECENTLY USED  00 ⇒ MOST RECENTLY USED

WRITE BACK
  1 ⇒ BLOCK ASSOCIATED DATA WORD MODIFIED  0 ⇒ BLOCK ASSOCIATED DATA WORD NOT MODIFIED

VALIDITY BIT
  1 ⇒ BLOCK ADDRESS VALID  0 ⇒ BLOCK ADDRESS INVALID

PARITY BIT
  1 OR 0 TO PROVIDE ODD PARITY OVER ALL 54 BITS (OTHER THAN PARITY BIT) STORED AT SET ASSOCIATED ADDRESS

CHECK BITS
  6-BITS TO PROVIDE SEC-DED OVER 48 BITS OF BLOCKS 0-3

Fig. 5

WORD FORMAT OF CACHE ADDRESS BUFFER SET-ASSOCIATED ADDRESSABLE LOCATION WORDS

| BLOCK 0 | | BLOCK 1 | BLOCK 2 | BLOCK 3 |
|---|---|---|---|---|
| DATA WORD 36-BITS | DATA WORD 36-BITS | DATA WORD 36-BITS | DATA WORD 36-BITS | DATA WORD 36-BITS |

Fig. 6

WORD FORMAT OF CACHE DATA BUFFER SET-ASSOCIATED ADDRESSABLE LOCATION WORDS

POST-WRITE ADDRESS WORD CORRECTION IN CACHE MEMORY SYSTEM

BACKGROUND OF THE INVENTION

In the prior art relating to electronic data processing systems it is known that the speed of operation of the system may be increased by the use of hierarchial memory systems of differing access times. One such system is the cache memory system in which a high speed buffer memory, i.e., the cache memory, is intermediate the requestor, i.e., the central processor unit (CPU), input/output unit (IOU), etc., and the low speed main storage unit (MSU). In the cache memory system of the V. K. Andersen, et al., U.S. Pat. No. 3,967,247, the cache memory system is incorporated in a storage interface unit (SIU) that is intermediate the CPU (requestor) and the MSU. The SIU is adapted to serve as a high speed buffer between the plural requestor units and the relatively low speed MSU in the data processing system. The high speed buffer, i.e., the cache memory, provides temporary storage for a limited number of blocks of data words that are also stored in the MSU.

When access to a particular requestor provided addressable location in the MSU is requested by a requestor, a check is made to determine if that address word is resident in the high speed buffer and if so, it is made available to the requestor for the reading out of or the writing into, i.e., modification or alteration of the data bits. If the desired address word is not resident in the high speed buffer, a block of data words in the high speed buffer is selected for replacement in accordance with a least recently used (LRU) algorithm. When a block of data words is to be displaced from the high speed buffer and a new block of data words is to be requested from the MSU, during the interval that the new block of data words is requested from the MSU the block of data words that is to be displaced is checked for modifications. If any data word of the old block of data words stored in the high speed buffer has been modified since it was originally obtained from the MSU, the entire block of data words is read into a temporary holding register and is restored in or written back into the MSU after the new block of data words has been entered into the high speed buffer at the addressable location vacated by the old block of data words that is to be written back into the MSU.

This operation is called a post-write operation in that the old block of data words that is to be removed from the high speed buffer and that is to be written back into the MSU is temporarily placed within a holding register within the SIU while the new block of data words is read out of the MSU and is stored in the addressable location in the high speed buffer that was vacated by the old block of data words. After the new block of data words has been written into the high speed buffer at the vacated addressable location, the old block of data words, i.e., the least recently used block of data words, is transferred from the holding register into the MSU at the addressable location specified by the address word that was previously stored in the address buffer portion of the cache memory system.

In the post-write operation of the cache memory system, upon readout of the least recently used block of data words from the data buffer portion of the cache memory system and the associated address word from the address buffer portion of the cache memory system, if there is an error in the read out address word, the erroneous address word results in the loss of the readout block of data words, i.e., the address word is in error and therefore the location of the block of data words is unknown. In addition, if the error occurred in the address word during a requestor read operation the erroneous address word, via the SIU, generates a Miss signal even though the correctable desired address word and the associated data word are available in the cache memory system. This erroneously generated Miss signal forces the associated electronic data processing system to undertake various procedures which needlessly occupy otherwise available computational time of the electronic data processing system. Accordingly, it is desirable that a means be provided whereby the number of Miss signals be held to a minimum and that blocks of data words are not lost (when a post-write operation is performed) due to a correctable error in the associated address word. This ensures maximum utilization of the electronic data processing system.

SUMMARY OF THE INVENTION

In an electronic data processing system incorporating a cache memory system, the present invention provides error correction of the address words upon read out from the address buffer portion of the cache memory system. The error correction circuitry is intermediate the cache address buffer and the address word comparator so that correctable errors in the read out address words do not generate Miss signals even though the desired address word and the associated data words in the data buffer portion of the cache memory system are available in the cache memory system. Additionally, the error correction circuitry is intermediate the cache address buffer and the LRU address word multiplexer so that blocks of data words are not lost to the system (when a post-write operation is performed) due to a correctable error in the associated address word. Further, a parity checker checks the parity of the readout uncorrected address words and generates alternative Good or Bad parity signals, which are used, via uncorrected and corrected address word comparators, to generate a Request Acknowledge or a MSU Request signal upon the determination of a Match with or a Miss of the requestor furnished address word and one of the address words stored in the cache address buffer.

BRIEF DESCRIPTION OF THE DRAWINGS

FIG. 4 is an illustration of the word format of requestor furnished words.

FIG. 5 is an illustration of the word format of cache address buffer set-associated addressable location words.

FIG. 6 is an illustration of the word format of cache data buffer set-associated addressable location words.

DESCRIPTION OF THE PREFERRED EMBODIMENTS

Figure 1:
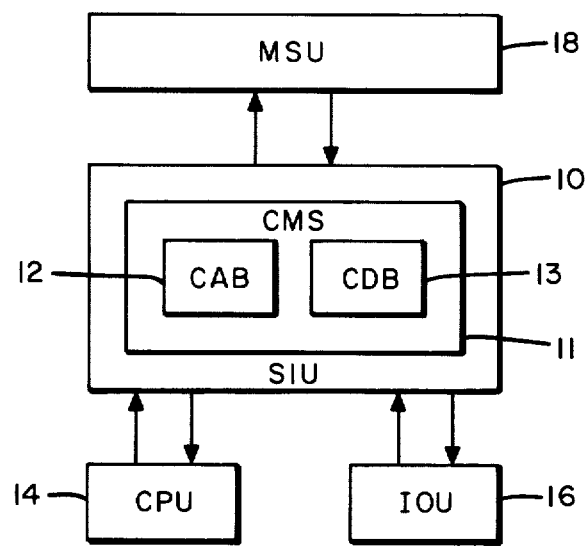
FIG. 1 is an illustration of a block diagram of an electronic data processing system into which the present invention may be incorporated.

With particular reference to FIG. 1 there is presented an illustration of a block diagram of an electronic data processing system into which the present invention may be incorporated. The electronic data processing system of FIG. 1 includes a hierarchial memory system in which a high-speed low-capacity buffer or cache memory system is positioned intermediate a plurality of requestors, i.e., a central processing unit (CPU) 14 and an input/output unit (IOU) 16, and a shared main storage unit (MSU) 18. The high-speed, low-capacity cache memory system 11, which may be comprised of a cache address buffer (CAB) 12 and a cache data buffer (CDB) 13, is incorporated within a storage interface unit (SIU) 10 which provides the means whereby the transfer of data between the requestors 14, 16 and the MSU 18 is controlled in an orderly manner. Such hierarchial memory system may be of many configurations such as that of the D. W. Anderson, et al., U.S. Pat. Nos. 3,735,360, the J. L. Brown, et al., 3,800,286, or the L. J. Boland, et al., 3,588,829, but in the preferred embodiment is directed toward a certain system such as that of the V. K. Anderson, et al., 3,967,247.

In a hierarchial memory system such as that of the V. K. Andeson, et al., patent, one or more requestors are adapted to receive instructions and operands (referred to as data words) from a main storage unit only by way of a high-speed buffer memory that is incorporated within a storage interface unit. The storage interface unit or SIU 10 is essentially a high-speed memory buffer that is designed to reduce the overall memory access time of an electronic data processing system by automatically allowing the great majority of memory references to take place in the higher speed SIU 10, rather than in the lower speed MSU 18. SIU 10 includes the necessary circuitry for transferring an, e.g., four-word block of data words into SIU 10 whenever any data word from that block is required or requested by one of the requestors 14, 16. This data block becomes one of several data blocks that remain resident in the SIU 10 until it is displaced by a new current data block as determined by a suitable least recently used replacement algorithm.

SIU 10 preferably utilizes a set-associative buffer memory. In an exemplary arrangement, the cache memory may comprise, e.g., 2,048 words that may be divided into, e.g., 128 sets, each set consisting of, e.g., four four-word blocks of data words. MSU 18 is then also divided into 128 sets, each set containing 1/128th of the data words in the total MSU addressable range. Any one of the four four-word data blocks in a given MSU set may be placed in any one of the four four-word data blocks in the corresponding SIU sets. When a transfer (either a read or a write operation) is made between SIU 10 and MSU 18, a four-word data block from contiguous addresses in MSU 18 is transferred to SIU 10 during a single MSU 18 memory cycle.

When a request for a data word from memory is made by one of the requestors 14, 16, the request is seen only by SIU 10. Conventional direct address selection is used to address one of the 128 sets in which the requested data word is located. This address selection causes SIU 10 to simultaneously read out the address word of each of the four four-word data blocks that are currently resident in the addressed set and to compare each with the requested address word. If one of the four four-word data block address words matches the requested address word, the appropriate data word is read from that data block and is sent to the requesting requestor. If none of the four four-word data block address words matches the requested address word, an immediate MSU Request is made by SIU 10 to MSU 18 for the entire four four-word data block that contains the desired data word.

While waiting for this new four-word data block, SIU 10 determines which one of the four current data blocks is the least recently used (LRU) and marks it for replacement. Next, SIU 10 checks the data block that is to be replaced, i.e., the LRU data block, to determine whether any data word in that data block has been modified while resident in SIU 10. If a modification has occurred, the entire four-word data block plus its address word is read into a temporary holding register in SIU 10 so that it can be restored to MSU 18 as soon as the current MSU 18 memory cycle is completed. When the requested data block is received by SIU 10 from MSU 18, the requested data block is stored into the now-vacated set addressable location and the appropriate data word is ultimately sent by SIU 10 to the requesting requestor 14, 16 to complete the MSU Request operation. If a modification to the LRU data block has occurred, this modified LRU data block is now written back into MSU 18. If no modification has occurred, no write back of the LRU data block is performed. This operation is called a "post-write" operation.

In some prior art hierarchial memory systems wherein high speed memory buffers are employed to increase the speed of the electronic data processing system, store or write operations always cause MSU 18 to be immediately updated. If the MSU 18 set being changed has a corresponding set in the high speed buffer in SIU 10, the corresponding set in the high speed buffer is also updated. That is, each time a requestor 14, 16 effects a write operation, MSU 18 must be immediately updated. This operation is called a "write-thru" operation. As MSU 18 operates at a relatively slow access time, the frequent references to MSU 18 required by a write-thru operation slow down the overall operating speed of the electronic data processing system.

To obviate this problem, the electronic data processing system of which the present invention is a portion thereof, utilizes the above discussed "post-write" operation. In this post-write method of operation, rather than making a write reference to MSU 18 every time a write operation is effected in the high speed SIU 10, as in the write-thru operation, MSU 18 is updated only when the data block that is resident in the high speed buffer contains altered or modified data, i.e., contains a data word different from that which is in its corresponding block in MSU 18, and is selected for replacement by the LRU algorithm.

Upon detecting that a desired or requestor requested address word is not resident in the high speed buffer of SIU 10, SIU 10 immediately sends a "Read" request to MSU 18 to obtain the entire four-word data block in which the desired data word is located. Simultaneously, SIU 10, through a least recently used replacement algorithm, determines which of the data blocks currently in the high speed buffer is to be replaced. A check is made to determine if this selected data block had its contents modified while resident in the high speed buffer and if so, the entire four-word data block plus its address word is gated into a temporary holding register. The new data block is brought into the high speed buffer from MSU 18 and stored in the now vacated data block addressable location in the high speed buffer and the now displaced data block that is now contained in the holding register is written back into MSU 18, thereby updating MSU 18. Accordingly, rather than requiring a relatively slow MSU 18 cycle time each time an alteration is made in a data block that is stored in the high speed buffer to update the corresponding data word that is stored in MSU 18, only one MSU 18 memory cycle is used to update MSU 18 and this update occurs only when a data block is selected for replacement and has had its contents modified while it was resident in the high speed buffer in SIU 10.

However, the use of a post-write operation, where the data block in the high speed buffer is being written back into MSU 18 after a new data block has been stored in the high speed buffer, is subject to a loss of data if an error occurred in the address word of the LRU block of data to be written back into MSU 18. Additionally, an error in the address word stored in the address buffer portion of the high speed buffer in SIU 10 during a reference by requestor 14, 16, which reference would have matched the requestor's address word, results in the generation of a Miss signal. This Miss signal, in turn, causes SIU 10 to generate and couple a Read reference, i.e., an MSU Request, to MSU 18, and, accordingly, further reduces the processing speed of the electronic data processing system. The present invention is directed toward an apparatus for and a method of providing error correction of address words when read out of the address buffer portion of the high speed buffer memory. This ensures that correctable errors in address buffer provided address words, as stored in or when read out of the address buffer portion of the high speed buffer memory, do not generate a Miss signal which, in turn, requires a MSU 18 reference even though the address word and the associated data words are available in the high speed buffer memory or do not result in a loss of a data block when a post-write operation is required.

Using the environment of the V. K. Anderson, et al., U.S. Pat. No. 3,967,247 as the preferred SIU 10 configuration, assume, however, for the purposes of the present invention that the cache address buffer (CAB) 12 and the cache data buffer (CDB) 13 are configured as in FIG. 2 herein and that the format of the requestor furnished address words is as illustrated in FIg. 4, that the format of the address words stored in each set-associated addressable location in CAB 12 is as illustrated in FIG. 5 and that the format of the data words stored in each set-associated addressable location in CDB 13 is as illustrated in FIG. 6. As discussed in the V. K. Anderson, et al., patent, SIU 10 uses a set associative CAB 12 and CDB 13. Assume for the present invention that MSU 18 has a capacity of 131,072 36-bit data words and that CAB 12 and CDB 13 have 128 set-associated addressable locations that are directly addressable large scale integrated (LSI) random access memories (RAMs). As MSU 18 and SIU 10 are set associative and as SIU 10 has 128 set-associated addressable locations, MSU 18 is divided into 128 sets each of $$131,072 \div 128 = 1,024$$

36-bit data words per set. If CAB 12 stores four set-associated address words at each set-associated addressable location and if CDB 13 stores four blocks each of four block associated data words at each set addressable location, SIU 10 stores $$128 \times 4 \times 4 = 2,048$$

data words. Accordingly, any 16 of the 1,024 data words of each of the 128 sets in MSU 18 may be stored at the one set-associated addressable location in SIU 10.

Figure 2:
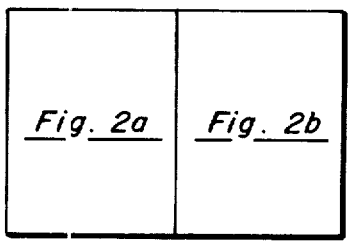
FIG. 2 is an illustration of a block diagram of a first embodiment of the present invention.
Figure 3:
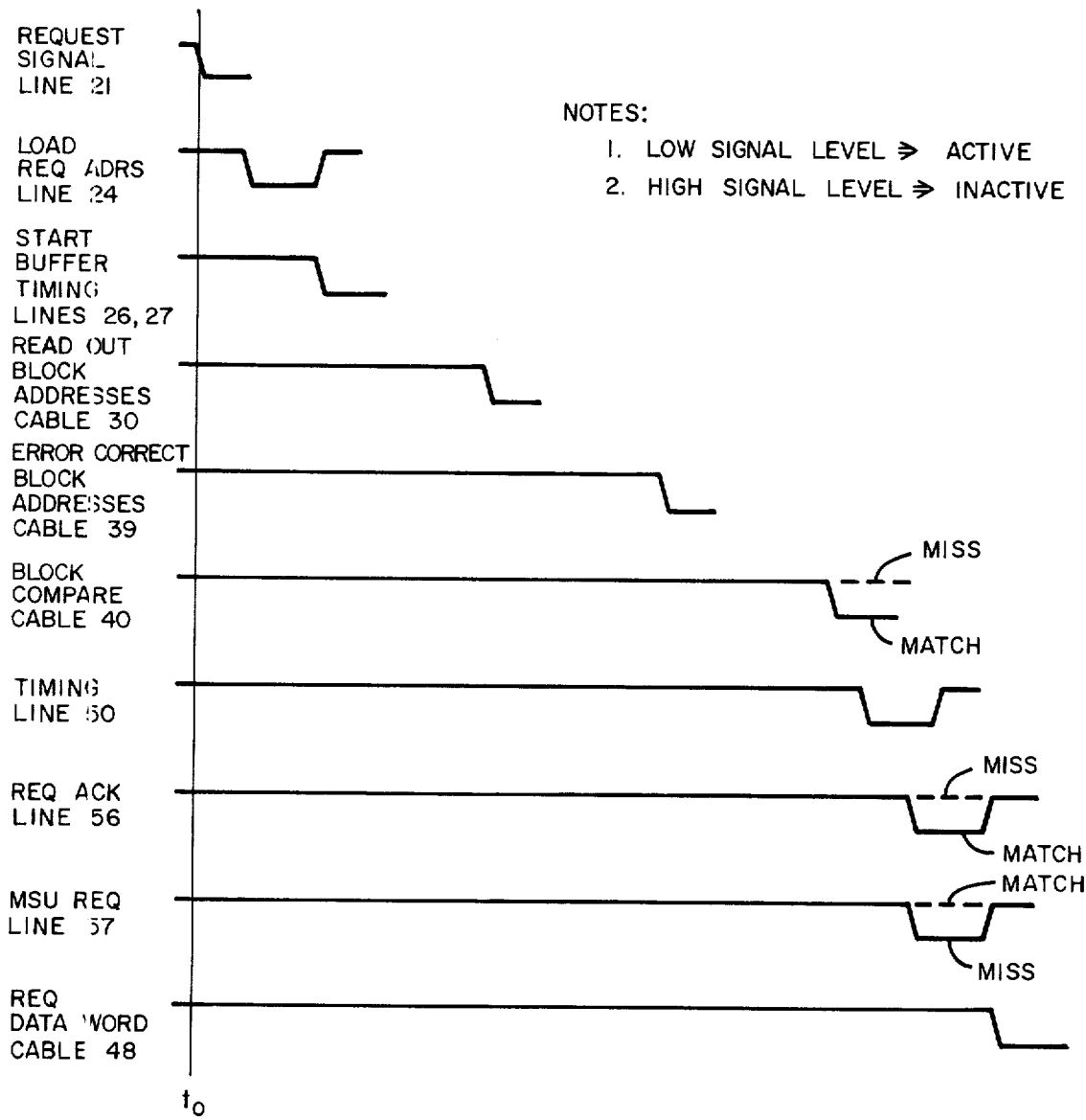
FIG. 3 is an illustration of a timing diagram associated with the embodiment of FIG. 2, composed of FIGS. 2a and 2b.
Figure 2A:
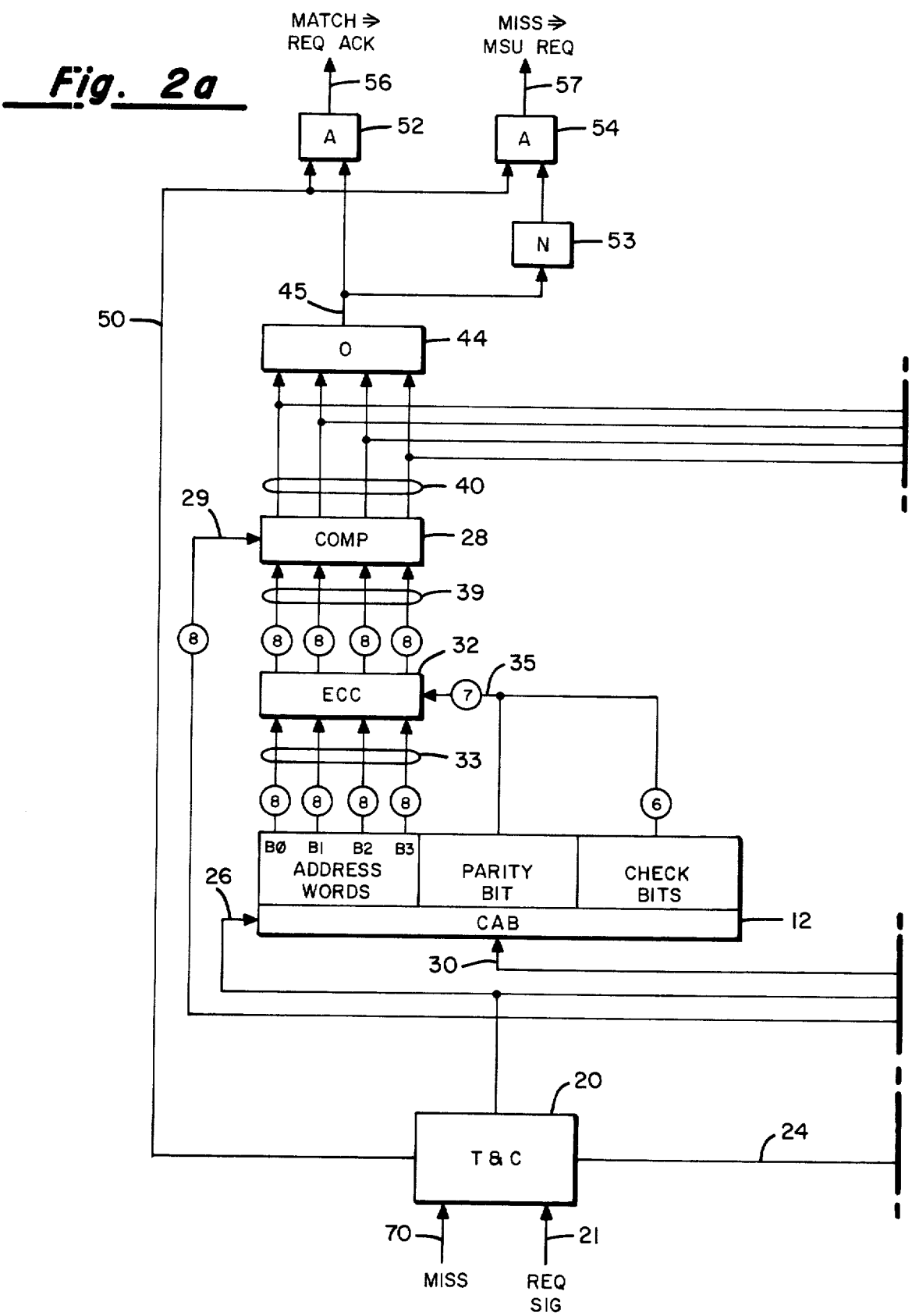
Figure 2B:
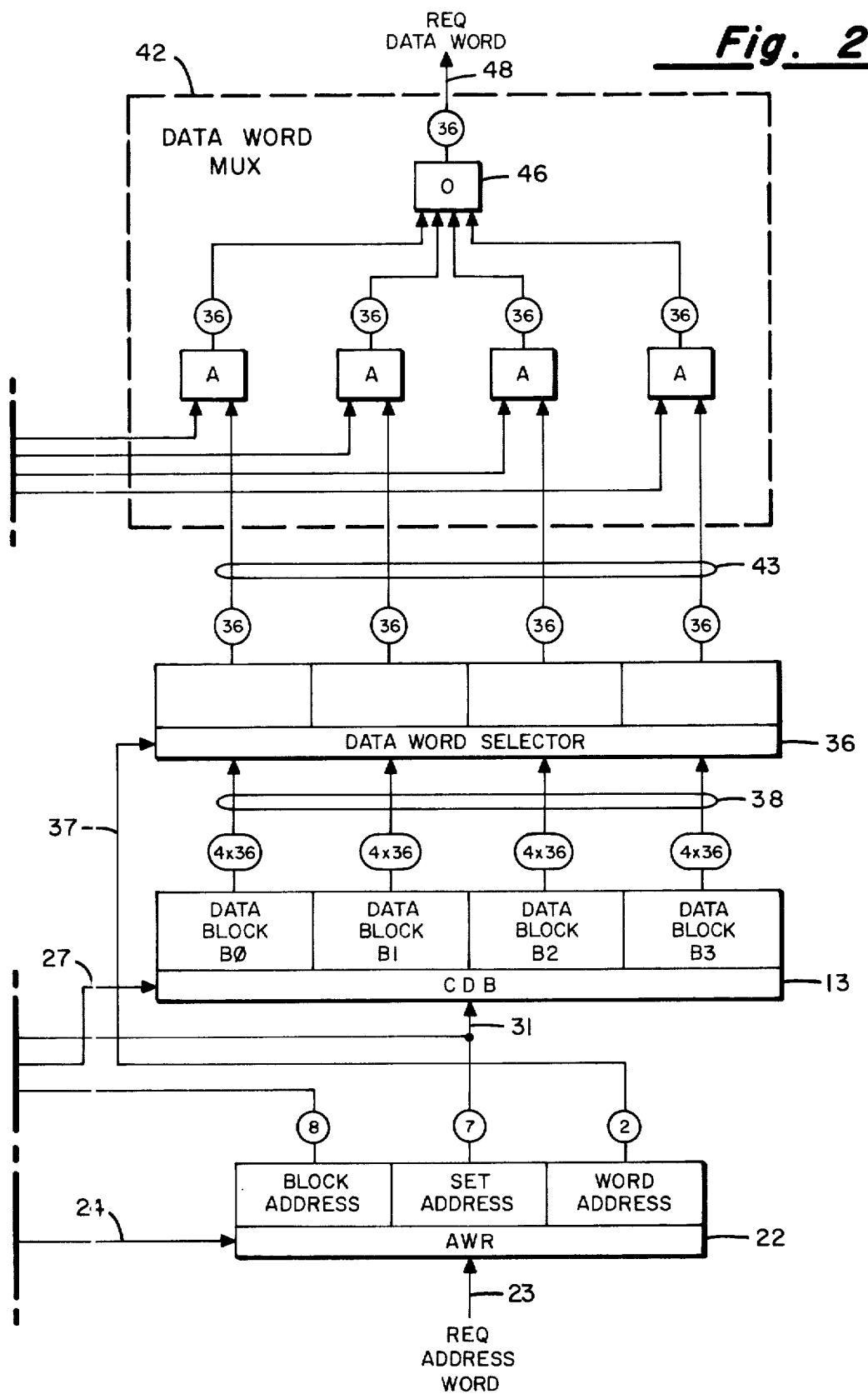

With particular reference to FIGS. 2 and 3 there are presented a block diagram of a preferred embodiment of the present invention and a timing diagram therefor. Operation of the embodiment of FIG. 2 is initiated by a requestor 14, 16 coupling its Request signal to timing and control 20 via line 21 and its address word to address word register (AWR) 22 via cable 23. Note that although not illustrated in FIG. 2, a multi-requestor system will include a priority system for the selection of the one requestor having the highest priority and a multiplexer for coupling the selected requestor's address word to AWR 22; such a system is disclosed in my copending patent application filed Sept. 20, 1976, having Ser. No. 724,681.

Next, the Request signal on line 21 initiates a timing chain in timing and control 20 which generates a Load Requesting Requestor Address Word signal on line 24, which, in turn, loads the requesting requestor's address word on cable 23 into AWR 22. Next, the timing chain in timing and control 22 couples a Start Buffer Timing signal to CAB 12 and CDB 13 via line 26 and 27, respectively.

Next, with the eight-bit block address word in AWR 22 coupled to block compare logic 28 via cable 29 and with the set address word in AWR 22 coupled to CAB 12 and CDB 13 via cables 30 and 31, respectively, the four address words of data blocks B0, B1, B2, B3 that are stored in CAB 12 at the set-associated addressable location in CAB 12 are coupled to ECC logic 32 via cable 33. The 6 check bits and the 1 parity bit that are stored in the associated portions of the set-associated addressable location in CAB 12 are coupled to ECC logic 32 via cable 35. At this time, ECC logic 32 performs error correction upon the four address words of data blocks B0, B1, B2, B3 as received from CAB 12 and couples the corrected (if a single bit correctable error did in fact exist therein) four address words to block compare logic 28 via cable 39. Block compare logic 28 compares each of the four corrected address words received from ECC logic 32 to the single block address word on cable 29 as received from AWR 22 and provides on one of the four lines of cable 40 a Match signal if a compare or a match of one of the address words is determined, or vel non, a $\overline{\text{Match}}$ signal on all of the four lines of cable 40 if no match is determined.

Additionally, at this time while the two word address bits in AWR 22 are coupled to data word selector 36 via cable 37, the four data blocks B0, B1, B2, B3 that are stored in the set-associated addressable location in CDB 13 are also coupled to data word selector 36 via cable 38. Note that as discussed hereinabove, in this embodiment each data block is comprised of four data words each of 36-bits in length. Accordingly, the word address bits on cable 37 select one data word out of each of its set-associated four data blocks, while the so-selected four data words are coupled to data word multiplexer 42 via cable 43.

Next, the $\overline{\text{Match}}$ signal in cable 40 at OR 44 couples a Match, or, alternatively, a Match signal, to line 45 while the Match signal in cable 40 at data word multiplexer 42 selects, vel non, the one data block associated data word of the four data words coupled to data word multiplexer 42, via cable 43, which, via OR 46, couples the one requestor addressed data word to the requesting requestor via cable 48.

Next, the timing chain in timing and control 20, via line 50, couples a timing signal to AND 52 and AND 54. The Match signal on line 45, via AND 52, couples a Match or Request Acknowledge signal to the requesting requestor via line 56. Conversely, a $\overline{\text{Match}}$ signal on line 45, via inverter (N) 53 and AND 54, couples a Miss or MSU Request signal to MSU 18 via line 57.

Figure 7:
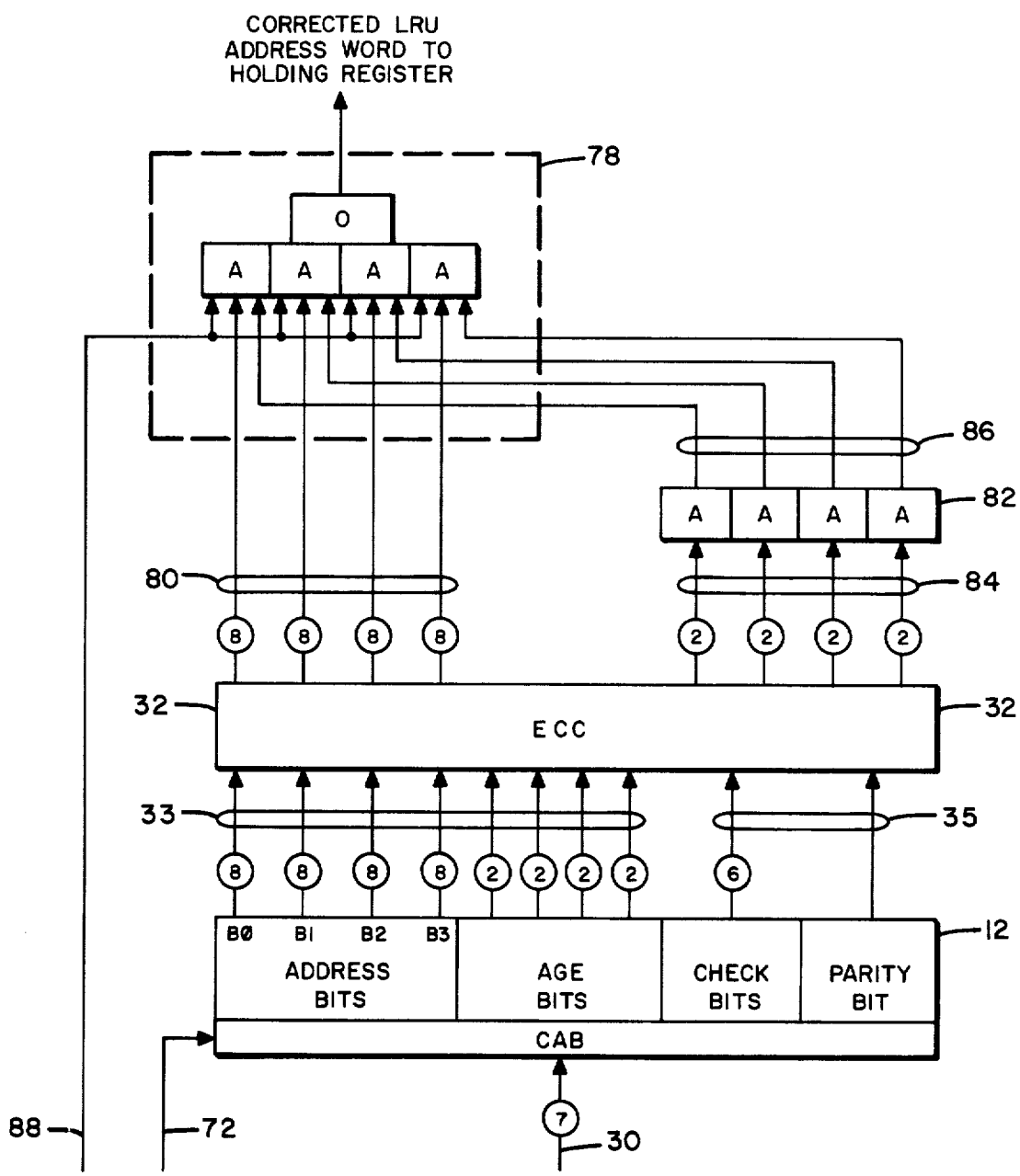
FIG. 7 is an illustration of a block diagram of a modification of FIG. 2 to effectuate error correction of the LRU address word.
Figure 8A:
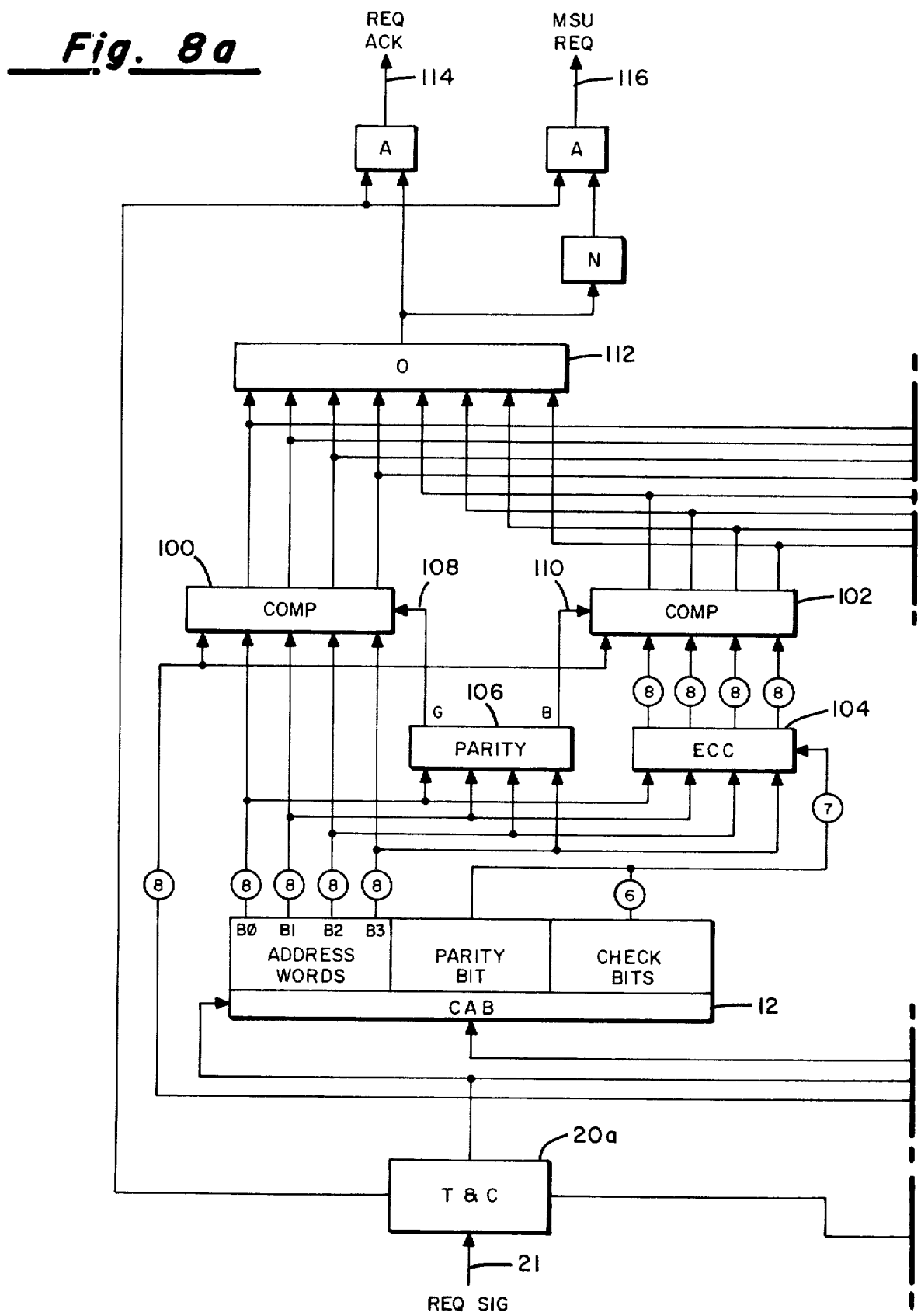
Figure 8B:
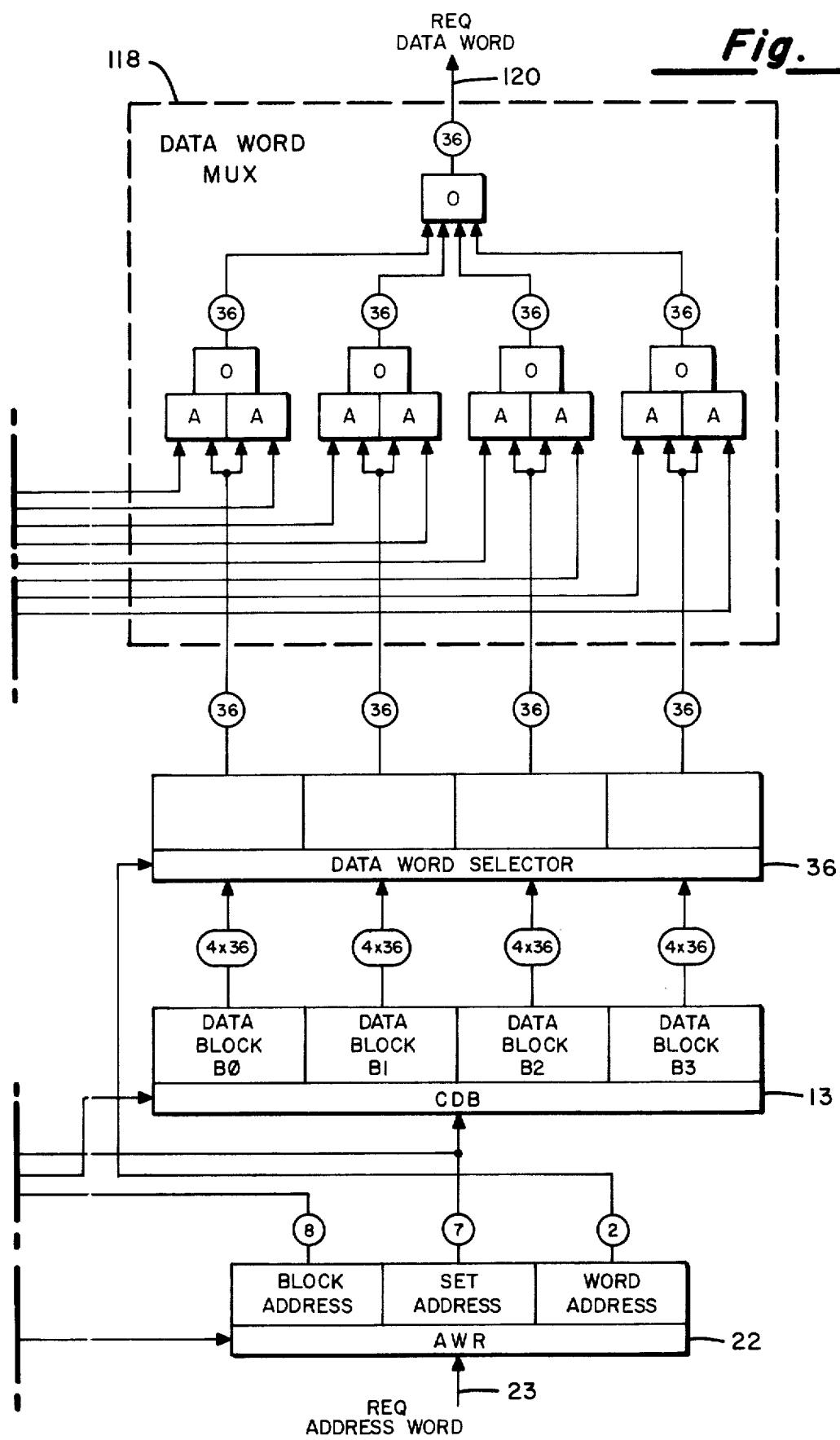
Figure 9A:
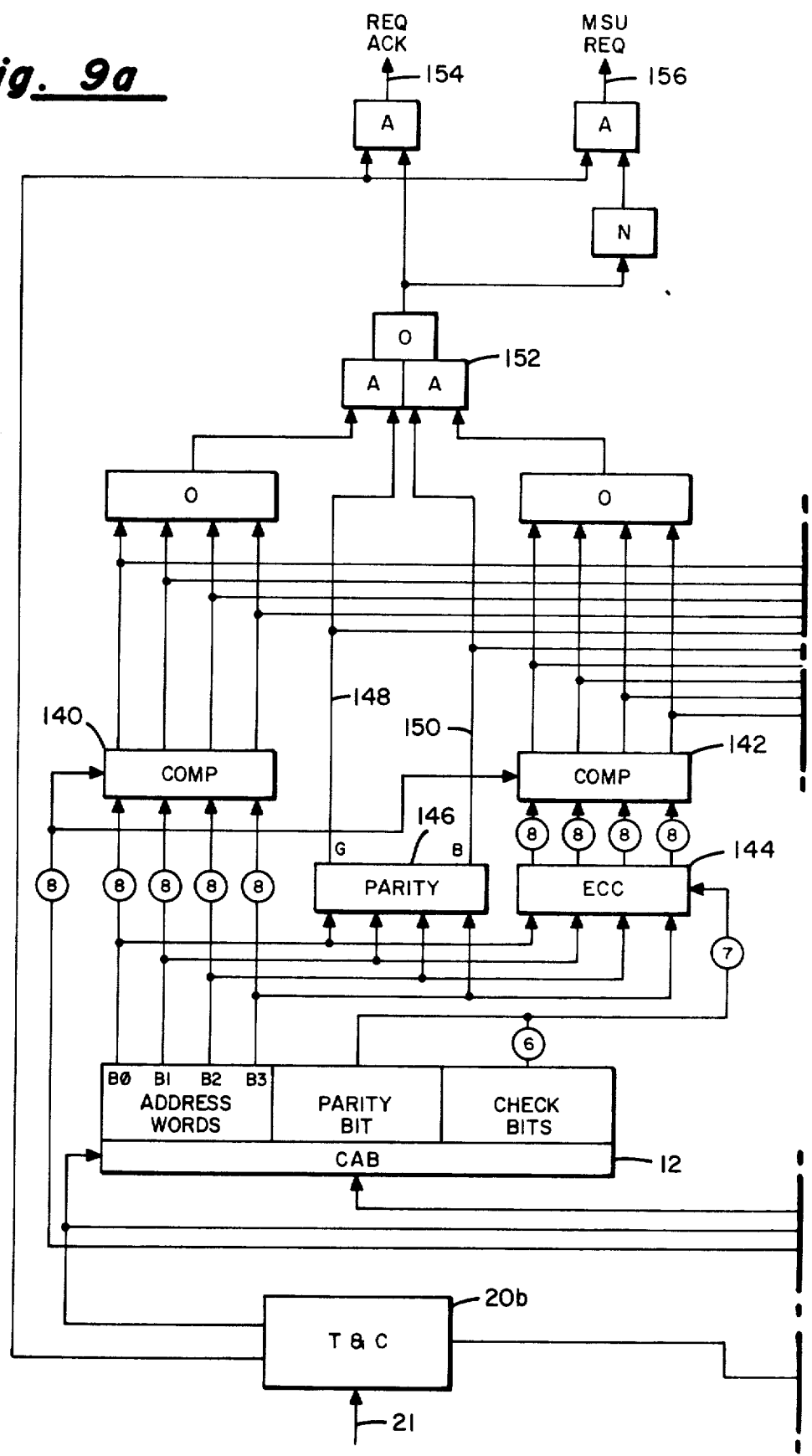
Figure 9B:
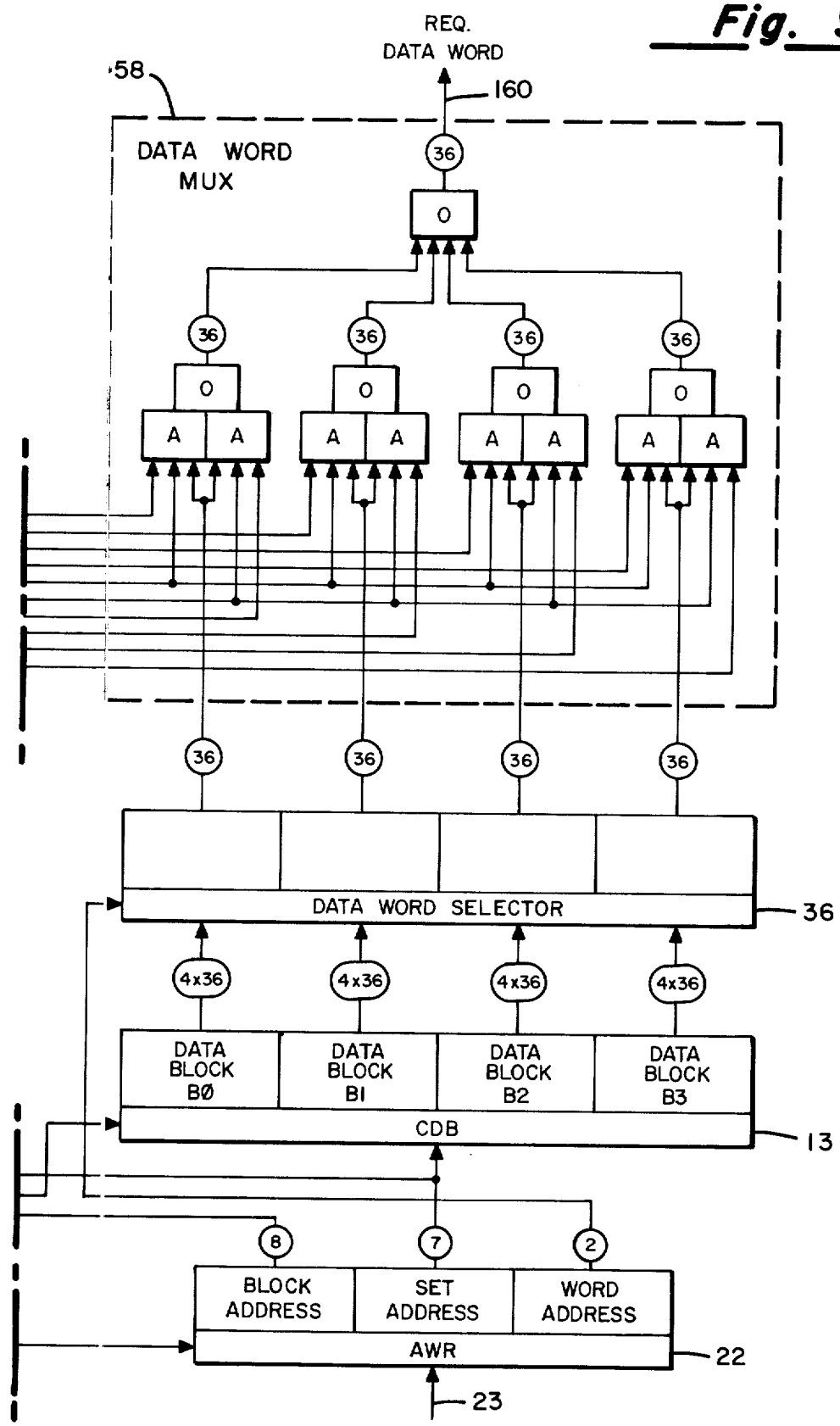

With particular reference to FIG. 7 there is presented an illustration of a block diagram of the logic associated with FIG. 2 to effectuate error correction of the LRU address word after a Miss has been determined, i.e., the desired data word is not resident in CDB 13. Upon the determination of a Miss condition, a Miss signal is coupled to timing and control 20 via line 70, as from line 57. A timing chain in timing and control 20 generates a timing signal that, via line 72, couples a Start Address Buffer Timing signal to CAB 12. Next, with the 7-bit set address word in AWR 22 coupled to CAB 12 via cable 30, the four address words and the four 2 age bits of data blocks B0, B1, B2, B3 that are stored in CAB 12 at the set-associated addressable location are coupled to ECC logic 32 via cable 33. The 6 check bits and the one parity bit that are stored in the associated portions of the set-associated addressable location in CAB 12 are coupled to ECC logic 32 via cable 35. At this time, ECC logic 32 performs error correction upon the four address words and the four 2 age bits of data blocks B0, B1, B2, B3, as received from CAB 12. ECC 12 then couples these corrected four address words to corrected LRU address word multiplexer 78 via cable 80 and the corrected four 2 age bits to age decoder 82 via cable 84.

Additionally, with the corrected four 2 age bits associated with the four data blocks B0, B1, B2, B3 coupled to age decoder 82, via cable 84, age decoder 82 determines which one of the four data blocks B0, B1, B2, B3 is the least recently used data block, i.e., whose age bits are 11. Age decoder 82 then, via one of the lines of cable 86, couples a LRU signal to corrected LRU address word multiplexer 78.

Next, the timing chain in timing and control 20, via line 88, couples a Gate Corrected LRU Address Word signal to corrected LRU address word multiplexer 78. The ANDing of the Gate Corrected LRU Address Word signal on line 88 and the one activated line of cable 86 by age decoder 82 at corrected LRU address word multiplexer 78 couples the corrected address word from the LRU data block of the four data blocks B0, B1, B2, B3 on cable 80 to the temporary holding register—not illustrated—within SIU 10.

Figure 8:
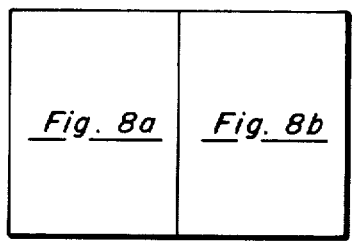
FIG. 8, composed of FIGS. 8a and 8b, is an illustration of a block diagram of a second embodiment of the present invention.

With particular reference to FIG. 8 there is presented an illustration of a block diagram of a second embodiment of the present invention. In this embodiment, the uncorrected and corrected address words of data blocks B0, B1, B2, B3 are, in parallel, coupled to comparator 100 and, via ECC logic 104, to comparator 102. Additionally, the uncorrected address words of data blocks B0, B1, B2, B3, are coupled to parity checker 106, which generates and couples to line 108 a Good Parity signal (G) and to line 110 a Bad Parity signal (B). Accordingly, the alternative Good or Bad Parity signals are used by comparator 100 or comparator 102 to gate the uncorrected or the corrected address words therein. The outputs of the two comparators 100, 102 are coupled to OR 112 for the generation of the Request Acknowledge signal, on line 114, or the MSU Request signal, on line 116, in a manner similar to that of FIG. 2, and to data word multiplexer 118, for the coupling to line 120, via data word selector 36, the one selected data word from the one selected data block in CDB 13.

Figure 9:
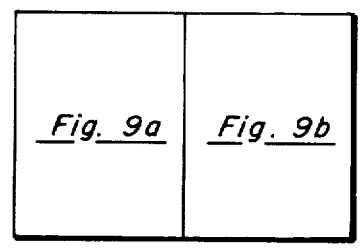
FIG. 9, composed of FIGS. 9a and 9b, is an illustration of a block diagram of a third embodiment of the present invention.

With particular reference to FIG. 9 there is presented an illustration of a block diagram of a further embodiment of the present invention. In this embodiment, the uncorrected and corrected address words of data blocks B0, B1, B2, B3 are, in parallel, coupled to comparator 140 and, via ECC logic 144, to comparator 142. Additionally, the uncorrected address words of data blocks B0, B1, B2, B3 are coupled to parity checker 146 which generates and couples to line 148 a Good Parity signal (G) or to line 150 a Bad Parity signal (B). In this embodiment, the alternative Good Parity signal or the Bad Parity signal is usd to gate the Match determination of comparator 140 or comparator 142 to AND/OR 152 whereby there is generated the Request Acknowledge signal, on line 154, or the MSU Request signal, on line 156, as in FIG. 2. Additionally, the outputs of the two comparators 140, 142 are coupled to data word multiplexer 158 for the coupling, to line 160, of the one selected data word, via data word selector 36, from the one addressed data block in CDB 13. In the embodiment of FIG. 9, as compared with that of FIG. 8, the compare Match time as determined by the logic operation of comparators 140, 142 is not cumulative to the parity determination time of parity generator 146 such that the Match function and the parity checking function are done in parallel resulting in no degradation of system performance.

Accordingly, it can be seen that the present invention provides a novel means of error correction of the address word in a cache memory system and provides a means whereby the number of Miss signals be held to a minimum and that blocks of data words are not lost (when a post-write operation is performed) due to a correctable error in the associated address word.

What is claimed is:

1. In an electronic data processing system that utilizes a high speed cache memory system intermediate a shared slow speed main storage unit and a plurality of requestors, which cache memory system includes an address buffer and a data buffer having set-associated addressable locations selected by a requestor furnished address word, the combination comprising:

a cache memory system including an address buffer and a data buffer having set-associated addressable locations in each of which in said address buffer are stored a plurality of address words and in said data buffer are stored a like plurality of associated blocks of data words;

an address word register for storing a requestor address word having a block address word and a set address word associated therewith;

an uncorrected address word comparator coupled to said address buffer and said address word register for comparing the address words stored in the set-associated addressable location in said address buffer selected by the set address word in said address word register to the block address word in said address word register and generating alternative Match or Miss signals indicative of said comparison;

error correction circuitry coupled to said address buffer for error correcting errors in the address words stored in the set-associated addressable location in said address buffer selected by the set address word in said address word register and generating corrected address words therefrom;

a corrected address word comparator coupled to said error correction circuitry for comparing said corrected address words to the block address word in said address word register and generating alternative Match or Miss signals indicative of said comparison;

parity checking means coupled to said address buffer for checking the parity of the address words stored in the set-associated addressable location in said address buffer selected by the set address word in said address word register and generating alternative Good Parity or Bad Parity signals therefrom; and, means responsively coupled to said Match or Miss signals generated by said uncorrected address word comparator and to said Good Parity signal generated by said parity checking means or to said Match or Miss signals generated by said corrected address word comparator and to said Bad Parity signal generated by said parity checking means for generating the alternatively a Request Acknowledge signal or an MSU Request signal.

2. In the electronic data processing system of claim 1:

age decoder means for determining which of the plurality of address words stored in the set-associated addressable location in said address buffer selected by set address word in said address word register is the least recently used address word and generating a LRU signal indicative thereof; and, a corrected LRU address word multiplexer coupled to said error correction circuitry and receiving said corrected address words therefrom and coupled to said age decoder means and receiving said LRU signal therefrom for emitting a corrected LRU address word therefrom.

3. In an electronic data processing system that utilizes a high speed cache memory system intermediate a shared slow speed main storage unit and a plurality of requestors, the combination comprising:

a cache memory system including an address buffer and a data buffer having associated addressable locations in each of which in said address buffer are stored a plurality of address words and in said data buffer are stored a like plurality of associated data words;

an address word register for storing a requestor address word;

an uncorrected address word comparator coupled to said address buffer and to said address word register for comparing the address words that are stored in an addressed addressable location in said address buffer to the address word that is stored in said address word register and generating alternative Match or Miss signals indicative of said comparison;

error correction circuitry coupled to said address buffer for error correcting errors in the address words stored in the addressable location in said address buffer and generating corrected address words therefrom;

a corrected address word comparator coupled to said error correction circuitry for comparing said corrected address words to the address word in said address word register and generting alternative Match or Miss signals indicative of said comparison; and, means responsively coupled to said Match or Miss signals generated by said uncorrected address word comparator or to said Match or Miss signals generated by said corrected address word comparator for generating the alternatively a Request Acknowledge signal or an MSU Request signal.

4. In the electronic data processing system of claim 3:

age decoder means for determining which of the plurality of address words stored in the addressed addressable location in said address buffer is the least recently used address word and generating a LRU signal indicative thereof; and, a corrected LRU address word multiplexer coupled to said error correction circuitry and receiving said corrected address words therefrom and coupled to said age decoder means and receiving said LRU signal therefrom for emitting a corrected LRU address word therefrom.

* * * * *

UNITED STATES PATENT AND TRADEMARK OFFICE
CERTIFICATE OF CORRECTION

PATENT NO. : 4,092,713
DATED : May 30, 1978
INVENTOR(S) : James Herman Scheuneman It is certified that error appears in the above-identified patent and that said Letters Patent are hereby corrected as shown below:

Column 9, Line 29, "generating the alternatively" should be -- generating alternatively --.

Column 10, Line 27, "generting" should be -- generating --.

Column 10, Line 34, "generating the alternatively" should be -- generating alternatively --.

Signed and Sealed this

*Twenty-fourth* Day of *October 1978*

[SEAL]

Attest:

RUTH C. MASON
*Attesting Officer*

DONALD W. BANNER
*Commissioner of Patents and Trademarks*

UNITED STATES PATENT AND TRADEMARK OFFICE
CERTIFICATE OF CORRECTION

PATENT NO. : 4,092,713
DATED : May 30, 1978
INVENTOR(S) : James Herman

It is certified that error appears in the above-identified patent and that said Letters Patent is hereby corrected as shown below:

Fig. 4 of the drawings should be added as shown on the attached sheet.

Signed and Sealed this

Sixteenth Day of July 1985

[SEAL]

Attest:

DONALD J. QUIGG

*Attesting Officer*   Acting Commissioner of Patents and Trademarks

UNITED STATES PATENT AND TRADEMARK OFFICE
CERTIFICATE OF CORRECTION

PATENT NO. : 4,092,713

DATED : May 30, 1978

INVENTOR(S) : James Herman

It is certified that error appears in the above-identified patent and that said Letters Patent are hereby corrected as shown below:

IN THE PRINTED PATENT

Sheet 1 of the Drawings. Add Fig. 4

| BLOCK ADDRESS | SET ADDRESS | WORD ADDRESS |
|---|---|---|
| $2^{16}$ ------ $2^9$ | $2^8$ ----- $2^2$ | $2^1, 2^0$ |

BLOCK ADDRESS
   8-BIT WORD THAT SPECIFIES 1 OF 256 DATA BLOCKS ALLOCATABLE TO EACH 1 OF 128 SETS

SET ADDRESS
   7-BIT WORD THAT SPECIFIES 1 OF 128 SETS INTO WHICH MSU 18 IS DIVIDED

WORD ADDRESS
   2-BIT WORD THAT SPECIFIES 1 OF 4 DATA WORDS ALLOCATABLE TO EACH 1 OF 256 DATA BLOCKS INTO WHICH EACH SET IS DIVIDED

Fig. 4

WORD FORMAT OF REQUESTOR FURNISHED ADDRESS WORDS